United States Patent [19]

Mink

[11] Patent Number: 4,678,393

[45] Date of Patent: Jul. 7, 1987

[54] LOADING AND UNLOADING MECHANISM

[76] Inventor: George Mink, 38296 Horseshoe Dr., Mt. Clemens, Mich. 48043

[21] Appl. No.: 834,114

[22] Filed: Feb. 24, 1986

Related U.S. Application Data

[63] Continuation of Ser. No. 544,085, Oct. 21, 1983, abandoned.

[51] Int. Cl.⁴ .................... B65G 47/52; F16H 21/54; F16H 25/18
[52] U.S. Cl. ........................................ 414/751; 901/7; 901/19; 74/107
[58] Field of Search ........................................ 901/6-8, 901/2, 19; 414/749-753; 198/346.2, 468.2; 74/104, 107

[56] References Cited

U.S. PATENT DOCUMENTS

| | | | |
|---|---|---|---|
| 2,711,817 | 6/1955 | Hautau et al. | 198/486 X |
| 3,253,518 | 5/1966 | Duemler | 74/104 X |
| 3,651,958 | 3/1972 | Evans et al. | 414/753 X |
| 3,658,190 | 4/1972 | Fournier | 414/753 X |
| 3,935,950 | 2/1976 | Burch | 414/744 A |
| 3,954,164 | 5/1976 | Bottomley | 198/486 X |
| 4,279,560 | 7/1981 | Ito et al. | 414/753 X |
| 4,343,590 | 8/1982 | D'Aloisio | 414/753 |

FOREIGN PATENT DOCUMENTS

| | | | |
|---|---|---|---|
| 123459 | 1/1959 | U.S.S.R. | 198/346.2 |
| 549321 | 10/1975 | U.S.S.R. | 901/7 |

Primary Examiner—Joseph J. Rolla
Assistant Examiner—Nils E. Pedersen
Attorney, Agent, or Firm—Harness, Dickey & Pierce

[57] ABSTRACT

An improved device for offering high speed transfer of articles between first, second and third stations. The device includes a pair of gripping devices each of which is movable along a first path with the first gripping device being operative to pick up an article at the first station and deposit it at the second station. The other gripping means is effective to grip the article at the second station and move it to the third station for release.

3 Claims, 9 Drawing Figures

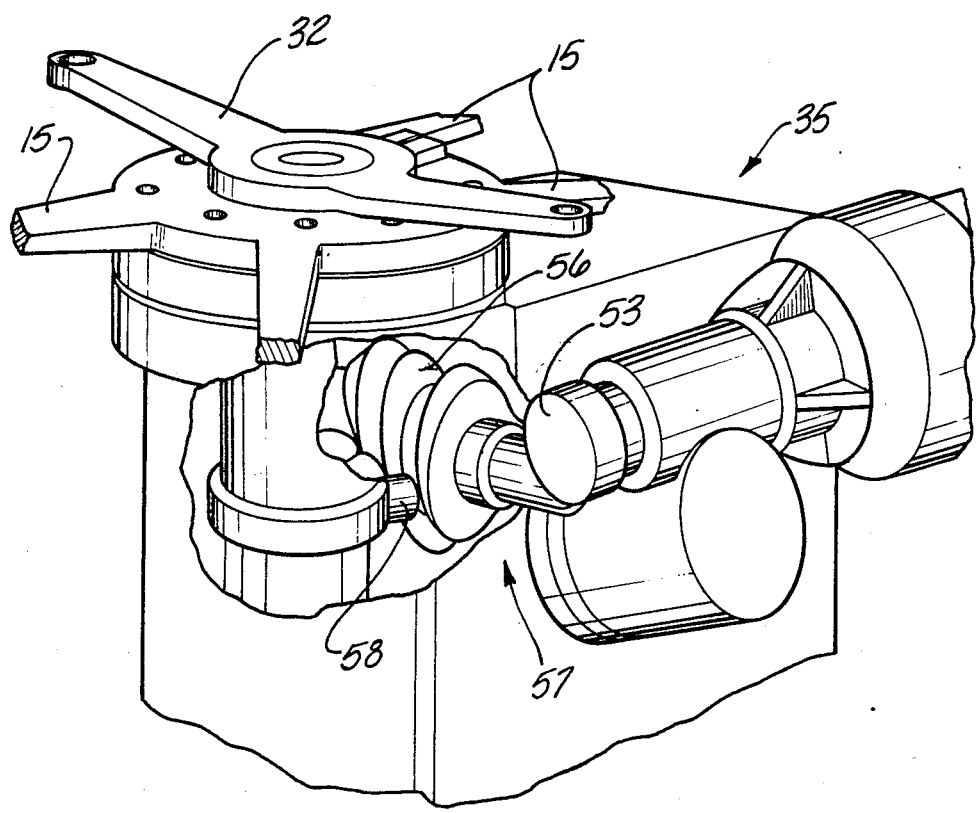
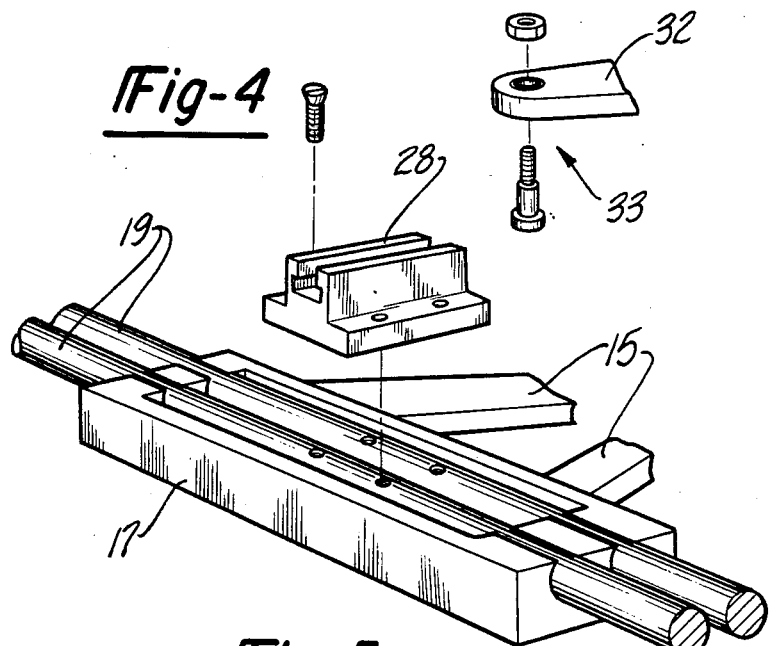
Fig-4
Fig-5

LOADING AND UNLOADING MECHANISM

This application is a continuation of application Ser. No. 544,085, filed Oct. 21, 1983 (now abandoned).

BACKGROUND OF THE INVENTION

This invention relates to a loading and unloading mechanism and more particularly to an improved material handling device for transferring an article from a first station to a second station and then removing the articles from the second station and placing it at a third station.

Various types of material handling devices have been proposed for moving articles from one station to another. Such devices have particularly utility in production lines where they can be used to reduce the necessity for an operator to do tedious labor and also can be used in areas where it is desired to protect the operator from possible injury by the associated machinery. Frequently, it is desirable to take an article from a first location, place it in a machine for an operation and subsequently remove the article from the machine and place it at another location. Devices have been proposed for this purpose that use a single gripper that picks up the article at the first station, transfers it to the machine and then removes it from the machine an places it at the other station. By using a single gripper, however, the speed of production is sustantially reduced. Alternatively, devices have been proposed that sequentially move an article in a hand-over-hand fashion down a sequence of steps. Such devices, however, are usable only when the successive stations are aligned with each other.

It is, therefore, a principal object of this invention to provide an improved loading and unloading mechanism for handling articles.

It is another object of this invention to provide a loading and unloading mechanism that permits two articles to be handled at the same time, thus increasing the speed of production.

It is a further object of this invention to provide a loading and unloading mechanism that is capable of handling more than one article and which uses a simplified drive mechanism.

SUMMARY OF THE INVENTION

A first feature of this invention is adapted to be used in a material transfer device for sequentially moving articles from a first station to a second station and from the second station to a third station. Such a device comprises a single driven member and motion transfer means for moving said single driven member between a first position and a second position. First gripping means adapted to selectively grip and release an article is supported for movement along a path from a first position wherein an article at the first station may be gripped and a second position wherein the gripped article may be deposited at the second station. Second gripping means which are also adapted to selectively grip and release a workpiece is supported for movement along a path from a first position wherein an article at the second station may be gripped and a second position wherein the gripped article may be deposited at the third station. Mechanical motion translation means are provided for moving the first gripping means between its first position and its second position and the second gripping means between its first position and its second position in response to movement of the single driven member between its first position and its second position.

Another feature of this invention is also adapted to be embodied in a material transfer device for sequentially moving articles from a first station to a second station and from the second station to the third station. In accordance with this feature of the invention, a drive member and a support member are interrelated with motion transfer means for moving the drive member and the support member between first positions and second positions and for moving the drive member relative to the support member between relative positions and second relative positions. First and second gripping means each adapted to selectively grip and release an article are each supported upon the support member for movement along paths from a first position to a second position. In its first position, the first gripping means is adapted to grip an article at the first station and deposit it when the first gripping means is in its second position. The second gripping means adapted to grip an article at the second station when in its first position and deposit an article at the third station when in its second position. First mechanical motion translation means are operative between the drive member and the first gripping member for moving the first gripping member between its positions in response to movement between the drive member and the support member from their first relative positions to their second relative positions. Second mechanical motion translation means is operative between the drive member and the second gripping member for moving the second gripping member between is first position and its second position in response to relative movement between said drive member and said support member from their first relative positions to their second relative positions.

BRIEF DESCRIPTION OF THE DRAWINGS

FIG. 1 shows the home position;

FIG. 2 shows a first pick-up position;

FIG. 3 shows a article depositing position.

FIG. 4 is a perspective view on an enlarged scale, with a portion broken away so as to show the motion translation mechanism.

FIG. 5 is an exploded perspective view of the mechanism for reciprocating the grippers.

DETAILED DESCRIPTION OF THE PREFERRED EMBODIMENT

Figure 1:
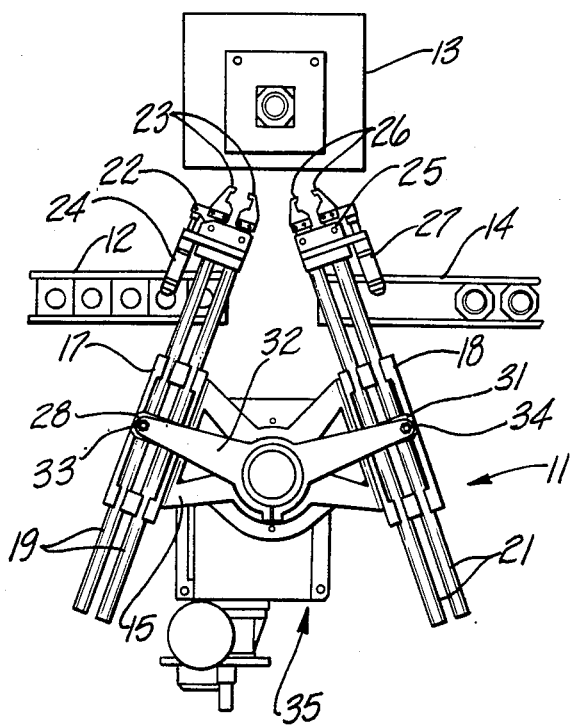
FIGS. 1 through 3 are top plan views of a loading and unloading apparatus constructed in accordance with an embodiment of the invention.
Figure 2:
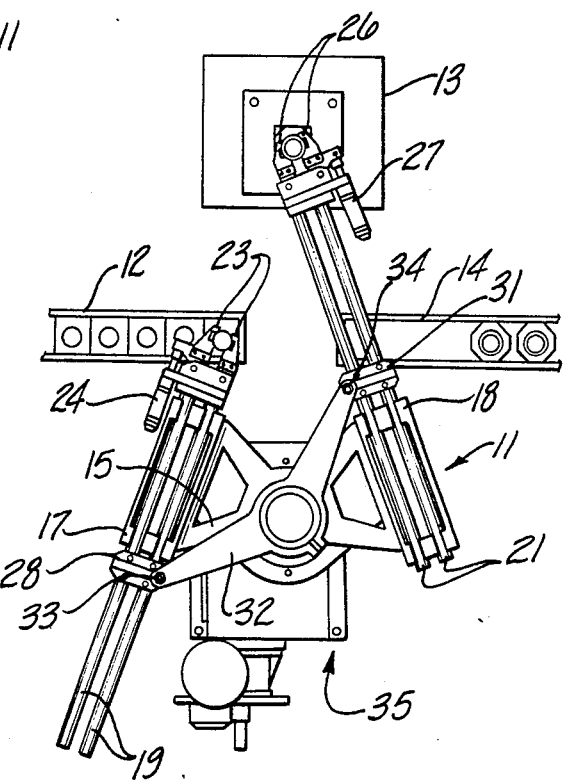
Figure 3:
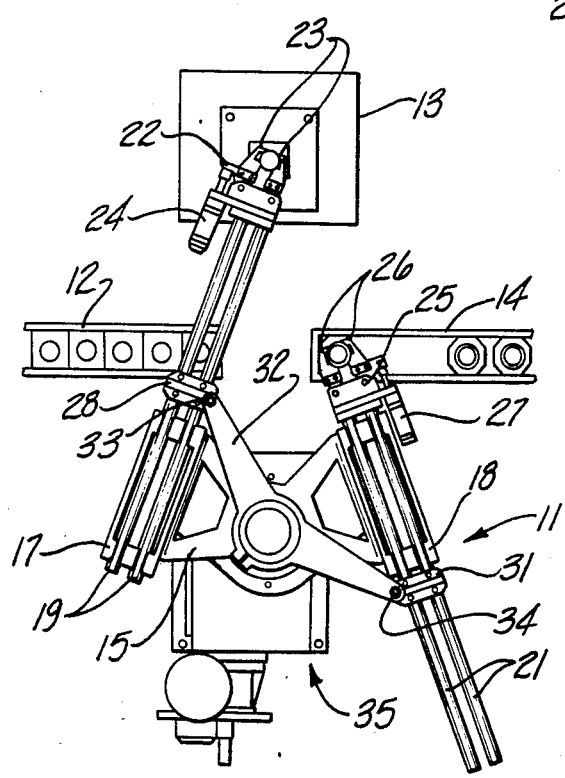

Referring first to FIGS. 1 through 3, a loading and unloading mechanism constructed in accordance with an embodiment of the invention is identified generally by the reference numeral 11. The loading and unloading mechanism 11 is particularly adapted for use in picking up articles at a first position from a conveyor 12 and placing them into a work station 13. The articles are then removed from the work station 13 and placed upon a discharge conveyor 14.

The device 11 includes a supporting member 15 that is adapted to be sequentially raised and lowered by a mechanism to be described. The supporting member 15 has a pair of outwardly extending arms each of which terminates in a respective portion 17, 18. The bearing portions 17 and 18 each support a pair of respective guide rods 19, 21. The guide rods 19 have affixed at their forward end a gripping device 22 that includes a pair of jaws 23 that are sequentially opened and closed in a suitable manner, as by means of a pneumatically operated cylinder 24. In a like manner, a gripping mechanism 25 is supported at the outer ends of the guide rods 21 and includes a pair of gripping jaws 26 that are operated by a pneumatic cylinder 27. A block 28 having a groove 29 (FIG. 5) formed therein is affixed to the guide rods 19. A similar block 31 has a similar groove and is affixed to the guide rods 19.

A drive member 32 is provided that is moved vertically with the support member 15, in a manner to be described, and which is also rotated while the support member 15 is held against rotation. The drive member 32 has a pair of outwardly extending arms that carry respective pins 33 and 34 that are received in the grooves of the blocks 28, 31, respectively, so as to effect reciprocation of the rods 19, 21 and gripping members 22, 25 in a manner to be described.

Referring now to FIGS. 4 and 6 through 9, the mechanism for operating the support member 15 and drive member 32 will be described. The drive mechanism is indicated generally by the reference numeral 35. The support member 15 is carried by a pair of depending guide pins 36 and 37 which are held in place by means of clamp plates 38 and 39, respectively. The pins 36 and 37 are suitably supported for axial movement in pairs of bushings 41, 42 which are, in turn, affixed to a generally cylindrical supporting assembly 43. The supporting assembly 43 is, in turn, affixed to a housing assembly 44. It should thus be clear that the support member 15 is axially slidable relative to the housing assembly 44 by virtue of the bushings 41 and 42 but is held against rotation.

The drive member 32 is affixed to a cylindrical post 45 that depends downwardly through an opening in the center portion of the support member 15. The drive member 32 is supported on the upper side of the support member 15 in a suitable manner so that the support member 15 will rise and lower the drive member 32, in a manner to be described. The cylindrical post 45 is supported for axial movement relative to an axially fixed sleeve 46 but is keyed for rotation with the sleeve 46 by a key and keyway construction indicated at 50. Thus, in addition to being axially movable with the supporting member 15, the drive member 32 is rotatable relative to it. The mechanism for raising and lowering the supporting member 15 and drive member 32 and for rotating the drive member 32 is contained within the housing 44.

Figure 6:
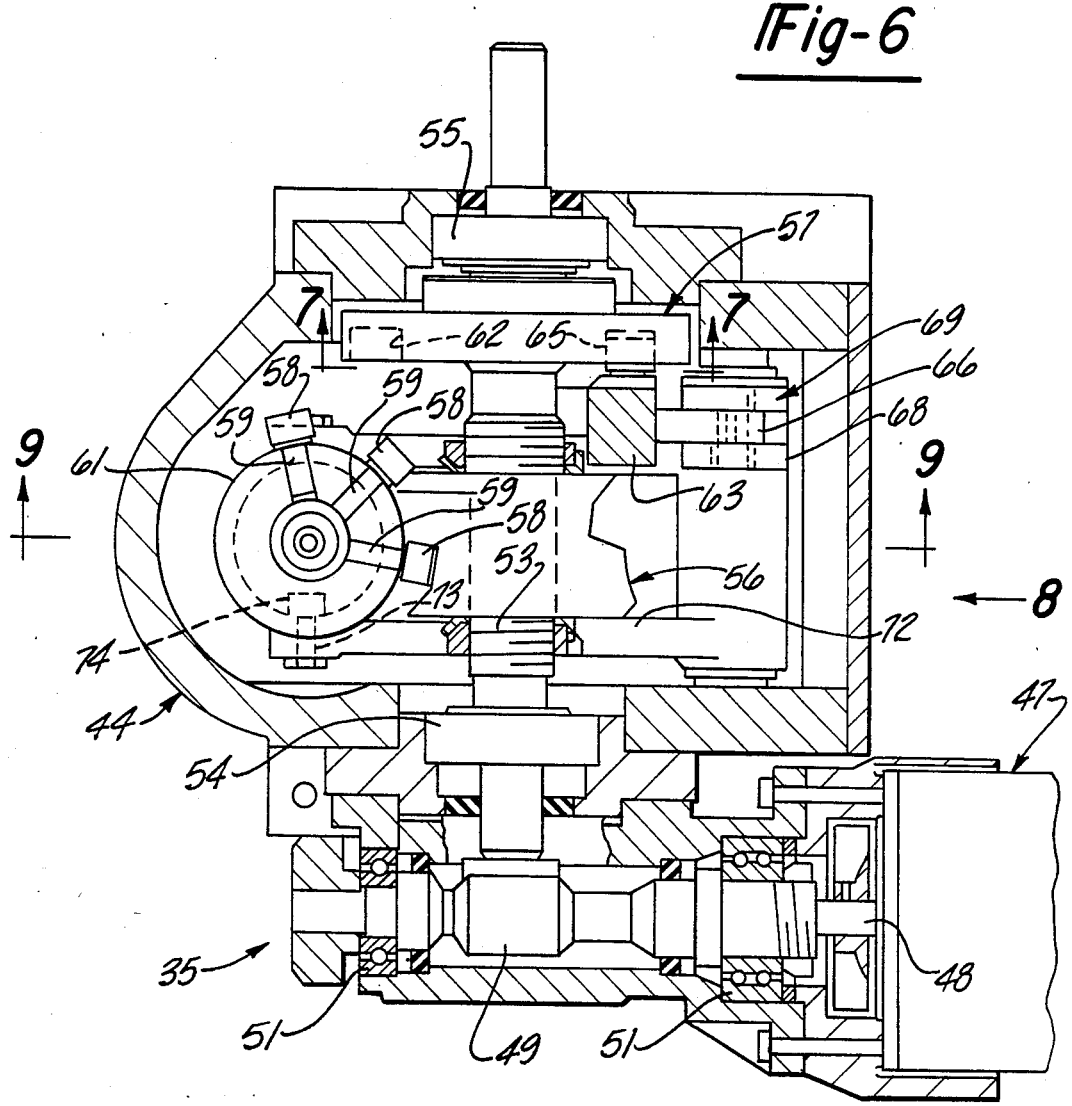
FIG. 6 is a cross-sectional view taken generally along a horizontal plane showing the motion translation mechanism.
Figure 7:
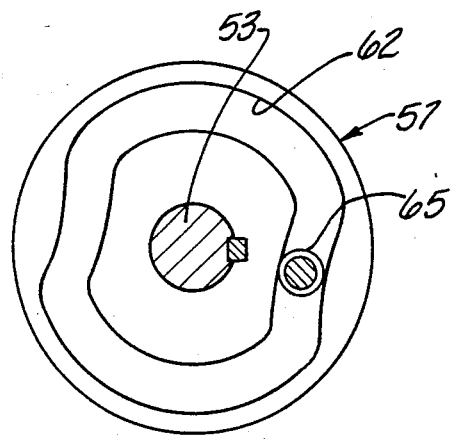
FIG. 7 is a cross-sectional view taken along the line 7—7 of FIG. 6.
Figure 8:
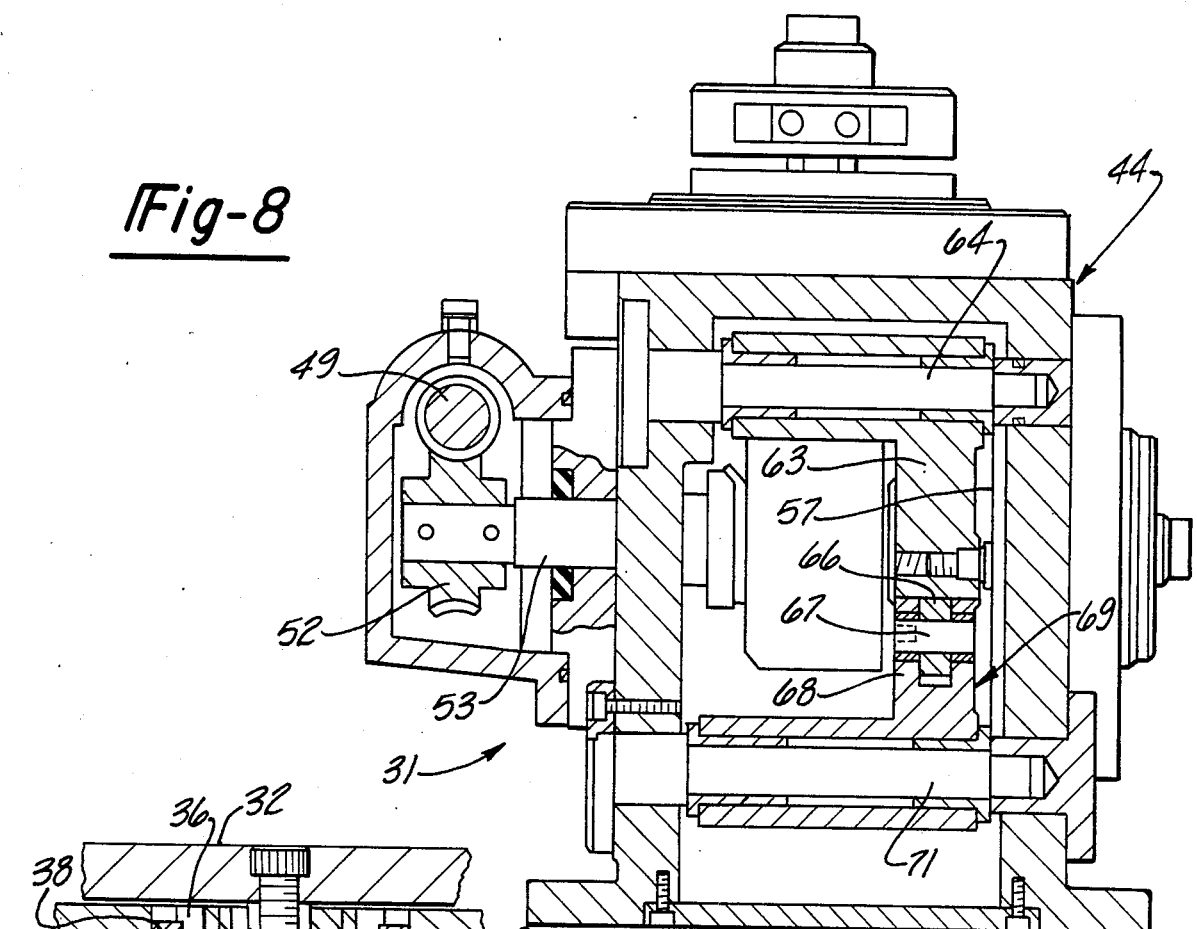
FIG. 8 is an elevational view, with a portion broken away, taken generally in the direction of the arrow 8 in FIG. 6.
Figure 9:
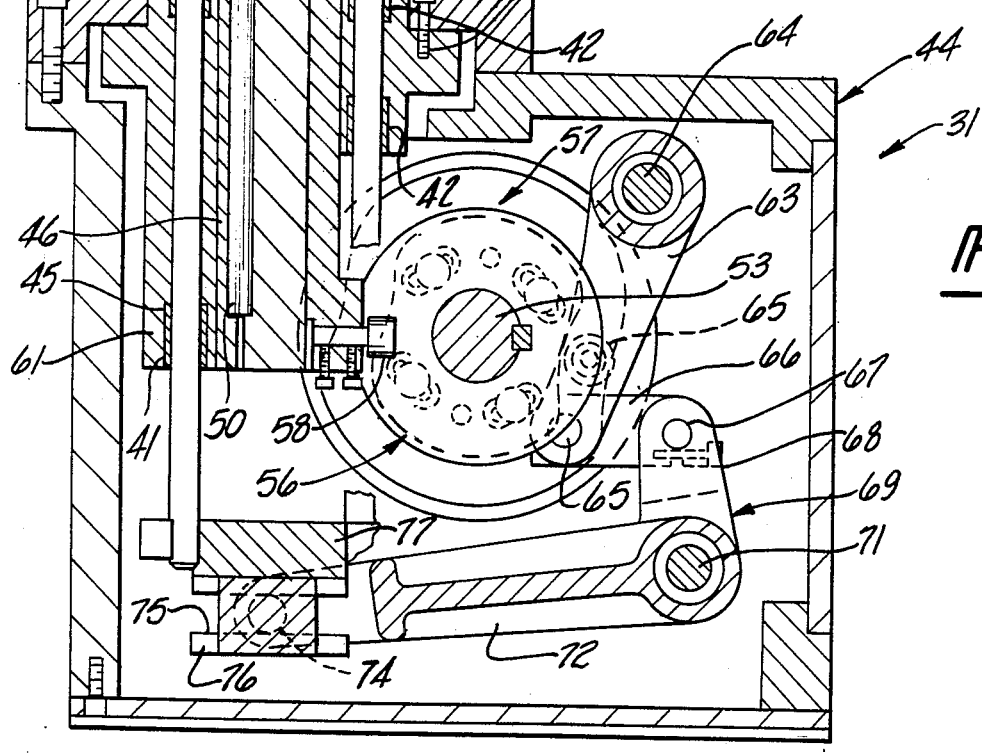
FIG. 9 is a cross-sectional view taken along the line 9—9 of FIG. 6.

Referring to this portion of the construction, a drive motor 47 has an output shaft 48 which is drivingly coupled to a worm gear 49 which is journalled in spaced bearing 51 (FIG. 6). The worm gear 49 is enmeshed with a worm wheel 52 that is fixed in a suitable manner to a camshaft 53. The camshaft 53 is journalled in the housing 44 in any suitable manner, as by means of spaced bearings 54 and 55. Between the bearings 54 and 55, two cams are affixed for rotation with the camshaft 53. These cams include a globoidal, roller-type cam, indicated generally by the reference numeral 56, and a face cam, indicated generally by the reference numeral 57. The globoidal roller-type cam 56 controls the rotational or oscillatory movement of the drive member 32 while the face cam 57 controls the axial or up and down movement of the support member 15 and drive member 32.

A plurality of roller followers 58 are journalled on pins 59 which extend radially from an annular collar 61 integrally formed on the lower end of the sleeve 46. The roller followers 58 coact with the roller-type globoidal cam 56 and cause an oscillation of the sleeve 46 and accordingly, the drive member 32 through the action of the key and keyway 50 upon rotation of the roller-type globoidal cam 56. The roller-type globoidal cam 56 is configured so that during a given cycle of operation, the drive member and the components driven by it and particularly the gripper devices 22, 25 will dwell at a first angular position (home), rotate to a second angular position, go through a dwell stage, rotate to a third angular position, dwell again, and then return back to the first angular position (home). This cycle of operation is achieved during single rotation of the camshaft 53. Alternative cycles of operation are believed obvious to those skilled in the art as is how such variations in cycle can be achieved.

The face cam 57 has a cam groove 62 formed in the face adjacent the globoidal cam 56. A lever 63 is journalled between the two cams 56 and 57 on a shaft 64 that is affixed in any suitable manner to the housing 44. Intermediate its ends, the lever 63 carries a roller follower 65 that is received in the cam groove 62 so as to cause oscillation of the lever 63 about the shaft 64 upon rotation of the cam shaft 53.

At a lower end of the lever 63, a pin 65 connects the lever 63 to a link 66. The opposite end of the link 66 is pivotally connected by a pivot pin 67 to an upstanding bifurcated arm 68 of a bell crank, indicated generally by the reference numeral 69. The bell crank 69 is, in turn, pivotally supported by the housing 44 upon a pivot shaft 71. The bell crank 69 has a second bifurcated arm 72, the terminal ends of which carry inwardly extending pins 73 which journal rollers 74. The rollers 74 are received in a circumferential groove 75 formed in a collar 76. The collar 75 engages the underside of a collar 77 to which the lower ends of the pins 36 and 37 are affixed. Pivotal movement of the bell crank 69 in a clockwise direction as viewed in FIG. 5 will cause the collar 76 and collar 77 and, accordingly, the support member 15 and drive member 32 to be elevated. If, however, the support member 15 or drive member 32 or any of the components carried thereby engage an obstacle that prevents downward movement, the collar 75 can move freely away from the collar 77 so that no force will be exerted on the obstacle. This provides safety effect.

The face cam 57 and its follower mechanism is configured so as to give rise to a sequence of operations that consist of a dwell, a activating movement that effects lowering of the support member 15 and drive member 32, rising of the drive member 32 and support member 15, lowering of these members, raising of them, and a further dwell operation.

The total operation of the mechanism will now be described. FIG. 1 illustrates the mechanism as it appears at rest. In this condition, the support member 15 and drive member 32 are elevated so that the grippers 22 and 25 will also be elevated. The drive member 32 is in a home or neutral position so that the gripping members 22 and 25 will be disposed between the extreme ends of their two paths of movement. When a cycle of operation is initiated by energization of the motor 47, the globoidal cam 56 will effect movement of the drive member 32 in a counterclockwise direction as shown in FIG. 1. At this time, both the drive member 32 and support member 15 are still in their elevated positions. This rotation of the drive member 32 continues until the pin 33 has caused the block 28 and the support rods 19 to have moved to withdraw the gripper 22 to a first position that is aligned with the conveyor 12. At the same time, the arm carrying the pin 34 will have moved so as to cause the block 31, support rods 21 and gripper 25 to move to its first outward position in alignment with the work station 13. These relative positions are as shown in FIG. 2.

When the gripper 22 is aligned with the conveyor 12 and the gripper 25 is in position at the work station 13, the cam 56 goes into a dwell stage and the face cam 57 is effective to cause lowering of the support member 15 and, accordingly, lowering of the drive member 32. Hence, the grippers 22 and 25 are both lowered. In the event an obstacle prevents such downward movement, the drive member 32 and support member 15 will be retained upwardly while the bell crank 69 will be pivoted in a counterclockwise direction and cause the collar 76 to move downwardly away from the collar 77. Assuming that there is no obstacle beneath the supporting member 15 or drive member 32 or the elements carried thereby, the grippers 22 and 25 will be lowered so that they will be in alignment with the conveyor 12 and work station 13. At this time, the respective gripping jaws 23, 25 will be held open. When the cam 57 has effected full lowering, the grippers 22 and 25 are actuated by the cylinders 24 and 27 so that a workpiece will be gripped from the conveyor 12 and if a workpiece is present in the station 13, it will also be gripped.

During this downward movement and the operation of the grippers 22 and 25, the roller cam 56 will be in a dwell position. Once the articles are gripped, the face cam 57 causes the drive member 21 and support member 15 to be re-elevated. Once this elevation has been completed, the face cam 57 goes into a dwell stage and the roller globoidal cam 56 goes into an active stage. This active stage of the roller globoidal cam 56 effects pivotal movement of the drive member 32 in a clockwise direction. This rotation causes the block 28, support rods 19 and gripper 22 to be moved from a first position in alignment with the conveyor 12 to a second position wherein the article is positioned at the work station 13. At the same time, the gripper 25 is moved from its first position in alignment with the work station 13 to its second position in alignment with the conveyor 14.

Once the globoidal cam 56 has accomplished this movement, it goes into a dwell stage and the face cam 57 causes lowering of the support member 15 and drive member 32 and, accordingly, the grippers 22 and 25. The jaws 23, 26 are then actuated by operating the cylinders 24 and 25 so that a workpiece will be deposited at the work station 13 by the gripper 22 and the removed workpiece from the work station 13 will be deposited on the conveyor 14 by the gripper 25. The mechamism is then actuated so as to return it to the home position as shown in FIG. 1. The mechanism by which this is accomplished is believed to be obvious from the foregoing description.

It should be readily apparent that this construction permits a rapid handling of a maximum number of workpieces in view of the fact that there are two gripping mechanisms each operating in synchronism with each other while at the same time avoiding any interference between them.

Although an embodiment of the invention has been illustrated and described, it is to be understood that various changes and modifications may be made without departing from the spirit and scope of the invention as defined by the appended claims.

I claim:

1. A material transfer device for sequentially moving articles from a first station to a second station and from said second station to a third station comprising a single driven member, motion transfer means for moving said single driven member between a first position and a second position, a supporting member having a pair of arms fixed at a predetermined angular relationship, first gripping means adapted to selectively grip and release an article, second gripping means adapted to selectively grip and release an article, means for supporting said first gripping means upon one arm of said supporting member for linear movement along a reciprocating path from a first position wherein an article at said first station may be gripped and a second position wherein a gripped article may be deposited at said second station, means for supporting said second gripping means upon the other arm of said supporting member for linear movement along a reciprocating path from a first position wherein an article at said second station may be gripped and a second position wherein the gripped article may be deposited at said third station, said paths of movement of said first and said second gripping means being nonparallel and intersecting, a driving member supported for movement in a first sense with said supporting member along an axis and for rotation relative to said supporting member about said axis, said driving member having a pair of arms fixed relative to each other and each carrying cam means cooperating with follower means on the respective of said gripping means for moving said first gripping means between its first position and its second position and said second gripping means between its first position and its second position in response to relative rotational movement of said driving member relative to said supporting member about said axis from a first angular position to a second angular position, and motion transmitting means for moving said supporting member and said driving member together along said axis from a first axial position to a second axial position and back to its first axial position and for rotating said driving member relative to said supporting member about said axis from its first angular position to its second angular position upon movement of said single driven member between its first position and its second position.

2. A material transfer device as set forth in claim 1 wherein the mechanical motion translation means positions the first gripping means in its first position and the second gripping means in its second position when the single driven member is in its first position and positions the first gripping means in its second position and the second gripping means in its first position when the single driven member is in its second position.

3. A material transfer device as set forth in claim 1 wherein the single driven member further has a third position positioned between the first and second positions and cooperates with the gripping means for positioning the gripping means each in a home position between their first positions and their second positions when the single driven member is in its third position.

* * * * *